Aug. 14, 1945.  D. CANADY  2,382,772
FILM FEEDING MECHANISM
Filed March 7, 1944  2 Sheets-Sheet 1

INVENTOR.
DON CANADY.
BY *H.C. Karel.*
ATTORNEY.

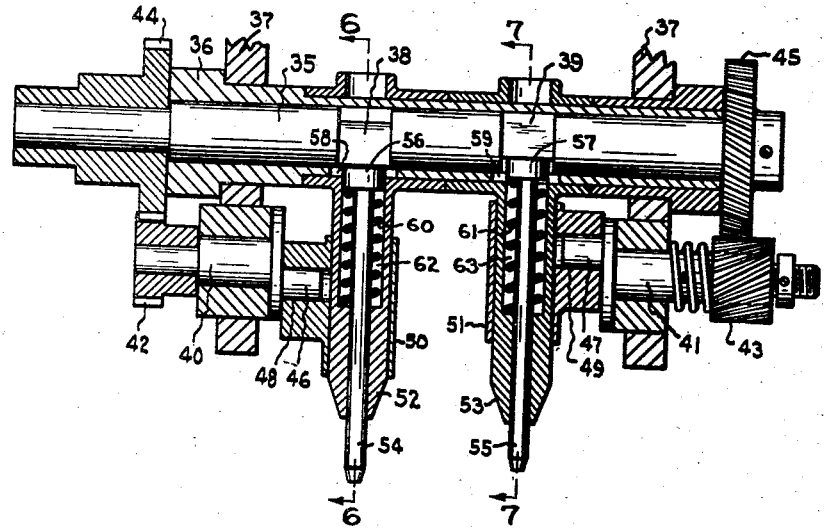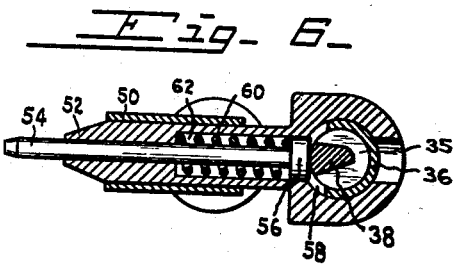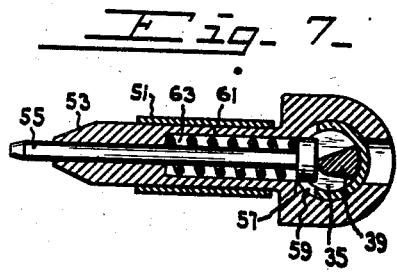

Patented Aug. 14, 1945

2,382,772

UNITED STATES PATENT OFFICE 2,382,772

FILM FEEDING MECHANISM

Don Canady, Cleveland, Ohio, assignor to Dayton Acme Co., Cincinnati, Ohio, a corporation of Ohio Application March 7, 1944, Serial No. 525,452

4 Claims. (Cl. 88—18.4)

My invention relates to mechanism for intermittently advancing perforated photographic film past the aperture in a camera or projector.

Present day requirements in producing and exhibiting sound films requires noiseless feeding mechanism capable of moving the film one frame at a time at high speed through a relatively short period of each cycle.

It is the object of the present invention to provide a cam and crank actuated claw having a double cycle of operation with the claw engaging the film on alternate strokes.

A further object is to provide means for exceptionally high speed photographic work wherein a rapid movement of the film is obtained without increasing the speed of the actuating mechanism.

My invention will be further readily understood from the following description and claims, and from the drawings, in which latter:

Fig. 5 is a horizontal section of a modified form.

Fig. 6 is a vertical section of a detail, taken in the plane of the line 6—6 of Fig. 5, and;

Fig. 7 is a vertical section of a detail, taken in the plane of the line 7—7 of Fig. 5.

Figure 1:
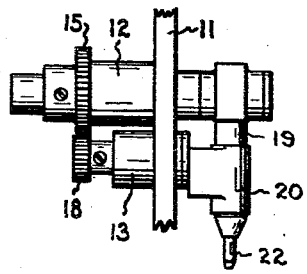
Fig. 1 is a plan view of the mechanism, with the frame partly broken away.
Figure 2:
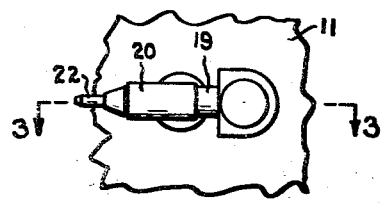
Fig. 2 is a side view of the same.
Figure 3:
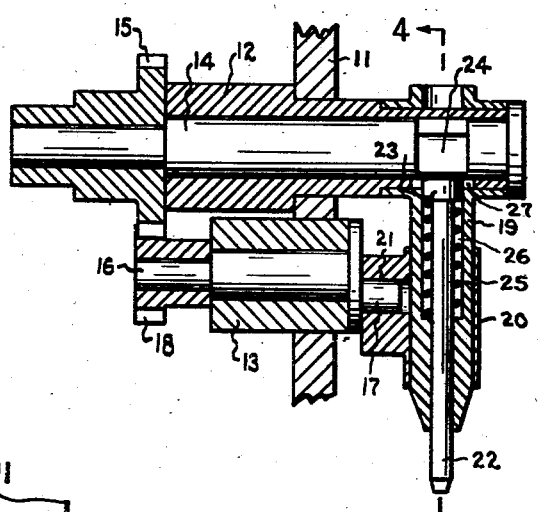
Fig. 3 is a horizontal cross-section of the same, taken in the plane of the line 3—3 of Fig. 2.
Figure 4:
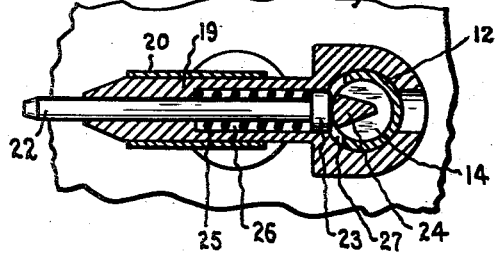
Fig. 4 is a vertical section, taken in the plane of the line 4—4 of Fig. 3.

My improved film feeding mechanism comprises a frame 11 having a pair of stationary sleeves 12 and 13 fixed in the frame. A shaft 14 is journalled in the sleeve 12 and is driven from a suitable source through the gear 15 fixed to the shaft 14.

A shaft 16 journalled in the sleeve 13 carries a crank pin 17 and is rotated by means of gear 18 meshing with the gear 15. A rocker arm 19 is pivoted about the sleeve 12 having a slide 20 slidable on the rocker arm and having an aperture 21 received over the crank pin 17. A claw 22 is provided with a head 23 held in engagement with a cam 24 on the shaft 14 by means of a spring 25 received in a counterbore 26 in the rocker arm 19. The sleeve 12 is provided with an aperture 27 to permit the rocker arm to rock and the head of the claw to extend therethrough.

The crank pin 17 revolves twice to each revolution of the cam shaft 14 and the cam is so shaped that the claw will be extended upon each alternate down stroke of the rocker arm for feeding the film one frame at a time.

In the modification shown in Figs. 5 to 7 inclusive, a double claw device is shown and is primarily useful for high speed cameras.

In this structure the shaft 35 rotates in a sleeve 36 fixed in the frame 37 and has a pair of cams 38 and 39 integral therewith. These cams are identical but positioned directly opposite each other on the shaft. Shafts 40 and 41 are rotatable in the frame and carry gears 42 and 43, meshing with gears 44 and 45 fixed to the shaft 35. Crank pins 46 and 47 extending from the shafts 40 and 41 engage apertures 48 and 49 in slides 50 and 51.

Rocker arms 52 and 53 are journalled about the sleeve and extend through the slides 50 and 51. Claws 54 and 55 are in the form of rods having heads 56 and 57 extending through apertures 58 and 59 in the sleeve 36 and engage the cams 38 and 39. Springs 60 and 61 received in bores 62 and 63 maintain the claw heads in engagement with the cams.

This structure is arranged to feed film having perforations along each margin of the film and on alternate down strokes of the rocker arm, each claw will be extended to engage the film. Thus, without increasing the speed of the feeding mechanism the film can be intermittently moved at twice the normal speed.

Heretofore, the mechanism used for moving the film limited the speed with which successive pictures could be taken.

Having thus fully described my invention, what I claim as new and desire to secure by Letters Patent is:

1. An intermittent feed mechanism comprising a cam shaft, a second shaft geared to said cam shaft, a crank on said second shaft, a slide reciprocated by said crank, a bearing for said first-named shaft, an arm pivoted on said bearing extending through said slide, and a claw extending through said arm reciprocated by said cam shaft.

2. An intermittent feed mechanism comprising a cam shaft, a second shaft geared to said cam shaft rotatable at twice the speed of said cam shaft, a crank on said second shaft, a slide reciprocated by said crank, a bearing for said first-named shaft, an arm pivoted on said bearing extending through said slide, and a claw extending through said arm reciprocated by said cam shaft.

3. An intermittent feed mechanism comprising a frame, a fixed sleeve extending through said frame, a shaft rotatable in said sleeve, a cam on said shaft, a rocker arm pivoted on said sleeve, a second shaft geared to said first-named shaft, a crank on said shaft, a slide on said rocker arm reciprocated by said crank, and a film driving claw reciprocating in said rocker arm and actuated by said cam.

4. An intermittent feed mechanism comprising a frame, a transverse shaft rotatable in said frame, a cam on said shaft, a rocker arm pivoted on said shaft, a second transverse shaft geared to said first-named shaft and rotatable at twice the speed of said first-named shaft, a crank on said shaft, a slide on said rocker arm reciprocated by said crank, a film driving claw reciprocating in said rocker arm actuated by said cam whereby said claw engages the film on alternate movements.

DON CANADY.